(12) United States Patent
Mirzaei et al.

(10) Patent No.: US 9,054,762 B2
(45) Date of Patent: Jun. 9, 2015

(54) TRANSMITTER DIVERSITY WITH A PASSIVE MIXER NETWORK

(71) Applicant: Broadcom Corporation, Irvine, CA (US)

(72) Inventors: Ahmad Mirzaei, Orlando, FL (US); Mohyee Salahelden Mikhemar, Aliso Viejo, CA (US); Meng-An Pan, Irvine, CA (US); Rahul Magoon, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 99 days.

(21) Appl. No.: 13/897,326

(22) Filed: May 17, 2013

(65) Prior Publication Data

US 2014/0321576 A1 Oct. 30, 2014

Related U.S. Application Data

(60) Provisional application No. 61/816,661, filed on Apr. 26, 2013.

(51) Int. Cl.
*H04L 27/00* (2006.01)
*H04B 7/06* (2006.01)

(52) U.S. Cl.
CPC .................................. *H04B 7/0682* (2013.01)

(58) Field of Classification Search
CPC ..... H03D 7/1458; H03D 7/1466; H03D 7/18; H03D 7/165; H03D 7/166

USPC ....................... 375/257, 295–298; 455/115.1, 455/101–103, 67.11
See application file for complete search history.

(56) References Cited

U.S. PATENT DOCUMENTS

| | | | |
|---|---|---|---|
| 7,826,549 B1 * | 11/2010 | Aggarwal | 375/270 |
| 8,223,885 B2 * | 7/2012 | Zhu et al. | 375/296 |
| 2008/0284487 A1 * | 11/2008 | Pullela et al. | 327/355 |
| 2010/0120369 A1 * | 5/2010 | Ko et al. | 455/67.11 |
| 2012/0039401 A1 * | 2/2012 | D'Souza et al. | 375/259 |
| 2012/0163627 A1 * | 6/2012 | Goodson et al. | 381/94.1 |
| 2014/0155007 A1 * | 6/2014 | Rofougaran | 455/115.1 |

* cited by examiner

*Primary Examiner* — Khanh C Tran
(74) *Attorney, Agent, or Firm* — McDermott Will & Emery LLP

(57) ABSTRACT

A transmitter circuit with a passive mixer network includes a first outbound signal path configured to carry a first outbound signal. The transmitter circuit includes a second outbound signal path configured to carry a second outbound signal. The transmitter circuit includes N passive mixers coupled to the first and second outbound signal paths and configured to up-convert the first and second outbound signals from a first frequency to a second frequency based on a clock cycle, where N is a positive even integer. The first and second outbound signals are passed through the N passive mixers during each phase of 2*N phases in the clock cycle. The transmitter circuit also includes N radio frequency signal paths coupled to an output of respective ones of the N passive mixers and configured to receive the first and second outbound signals in the second frequency during each phase of the clock cycle.

20 Claims, 9 Drawing Sheets

US 9,054,762 B2

TRANSMITTER DIVERSITY WITH A PASSIVE MIXER NETWORK

CROSS-REFERENCE TO RELATED APPLICATIONS

The present application claims the benefit of U.S. Provisional Patent Application Ser. No. 61/816,661, titled "TRANSMITTER DIVERSITY WITH A PASSIVE MIXER NETWORK," filed on Apr. 26, 2013, which is hereby incorporated by reference in its entirety for all purposes.

BACKGROUND

Wireless communication devices include transceivers for transmitting and receiving differential radio frequency (RF) signals. The transceiver can include multiple signal paths such that each signal path carries respective ones of the In-phase (I) and Quadrature-phase (Q) components of the differential RF signal. The transceiver may include a passive mixer for frequency conversion to RF. The passive mixer may be driven by one or more duty cycles of a clock signal. Mixer techniques may include having each duty-cycle correspond to a respective component signal. In this regard, the switching of the positive and negative signaling of each component signal is performed on different clock cycles. In turn, the switches during non-corresponding clock cycles are kept idle, thus resulting in waste of transmission resources.

SUMMARY

A system and/or circuit is provided for transmitter diversity with a passive mixer network, substantially as illustrated by and/or described in connection with at least one of the figures, as set forth more completely in the claims.

BRIEF DESCRIPTION OF THE DRAWINGS

Certain features of the subject technology are set forth in the appended claims. The accompanying drawings, which are included to provide further understanding, illustrate disclosed aspects and together with the description serve to explain the principles of the disclosed aspects. In the drawings:

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of these specific details. In one or more instances, structures and components are shown in block diagram form in order to avoid obscuring the concepts of the subject technology.

The subject disclosure provides a transmitter circuit that is configured to receive multiple outbound component signals and up-converting the component signals based on a clock cycle using multiple passive mixers such that all of the component signal inputs are present at the outputs of the passive mixers during each phase of the clock cycle. As such, the amount of time switches are kept idle is reduced. The aforementioned mixer techniques may up-convert outbound component signals despite transmission resource inefficiencies. As will be discussed in further detail below, the increased switching activity in accordance with one or more implementations can be implemented as a power combining transmitter or a beam-forming transmitter to provide for transmitter diversity.

In some implementations, a transmitter circuit with a passive mixer network includes a first outbound signal path configured to carry a first outbound signal. The transmitter circuit includes a second outbound signal path configured to carry a second outbound signal. The transmitter circuit includes N passive mixers coupled to the first and second outbound signal paths and configured to up-convert the first and second outbound signals from a first frequency to a second frequency based on a clock cycle, where N is a positive even integer. The first and second outbound signals are passed through the N passive mixers during each phase of 2*N phases in the clock cycle. The transmitter circuit also includes N radio frequency signal paths coupled to an output of respective ones of the N passive mixers and configured to receive the first and second outbound signals in the second frequency during each phase of the clock cycle.

Figure 1:
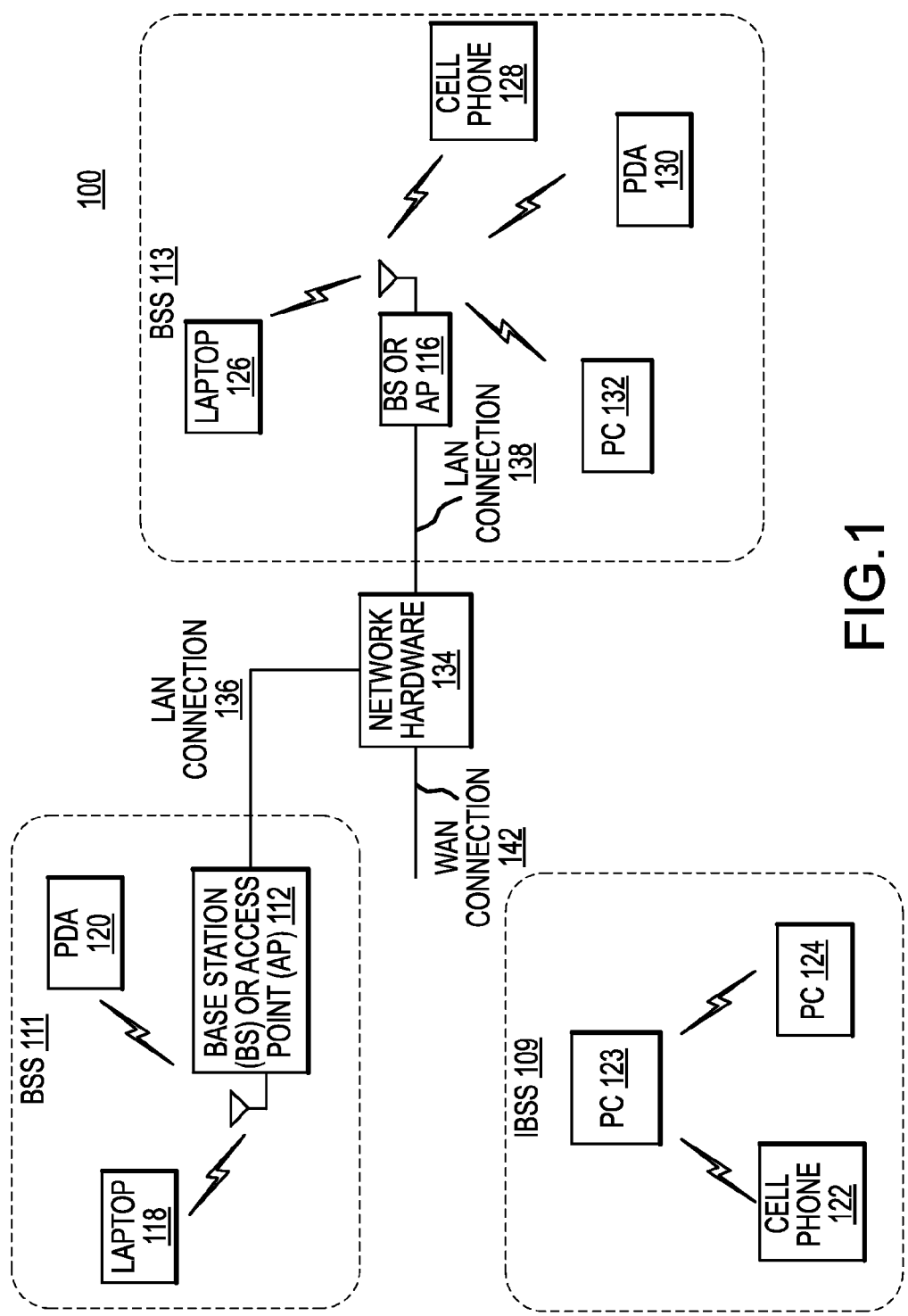
FIG. 1 is a diagram illustrating an example of a wireless communication system in accordance with one or more implementations.

FIG. 1 is a diagram illustrating wireless communication system 100 in accordance with one or more implementations. Wireless communication system 100 includes base stations and/or access points 112, 116, wireless communication devices 118-132 and a network hardware component 134. Note that the network hardware 134, which may be a router, switch, bridge, modem, or system controller, provides a wide area network connection 142 for the wireless communication system 100. Further note that wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within independent basic service set (IBSS) area 109 and communicate directly (e.g., point to point). In this configuration, wireless communication devices 122, 123, and 124 may only communicate with each other. To communicate with other wireless communication devices within the wireless communication system 100 or to communicate outside of the wireless communication system 100, wireless communication devices 122, 123, and/or 124 can affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access points 112, 116 with connectivity to other devices within the wireless communication system 100 and provides connectivity to other networks via the WAN connection 142. To communicate with wireless communication devices 118-132 within BSS 111 and 113, each of the base stations or access points 112, 116 has an associated antenna or antenna array. In one or more implementations, base station or access point 112 wirelessly communicates with wireless communication devices 118 and 120 while base station or access point 116 wirelessly communicates with wireless communication devices 126-132. Wireless communication devices 118-132 can register with a particular base station or access point 112, 116 to receive services from the wireless communication system 100.

According to some implementations, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), enhanced data rates for GSM evolution (EDGE), general packet radio service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
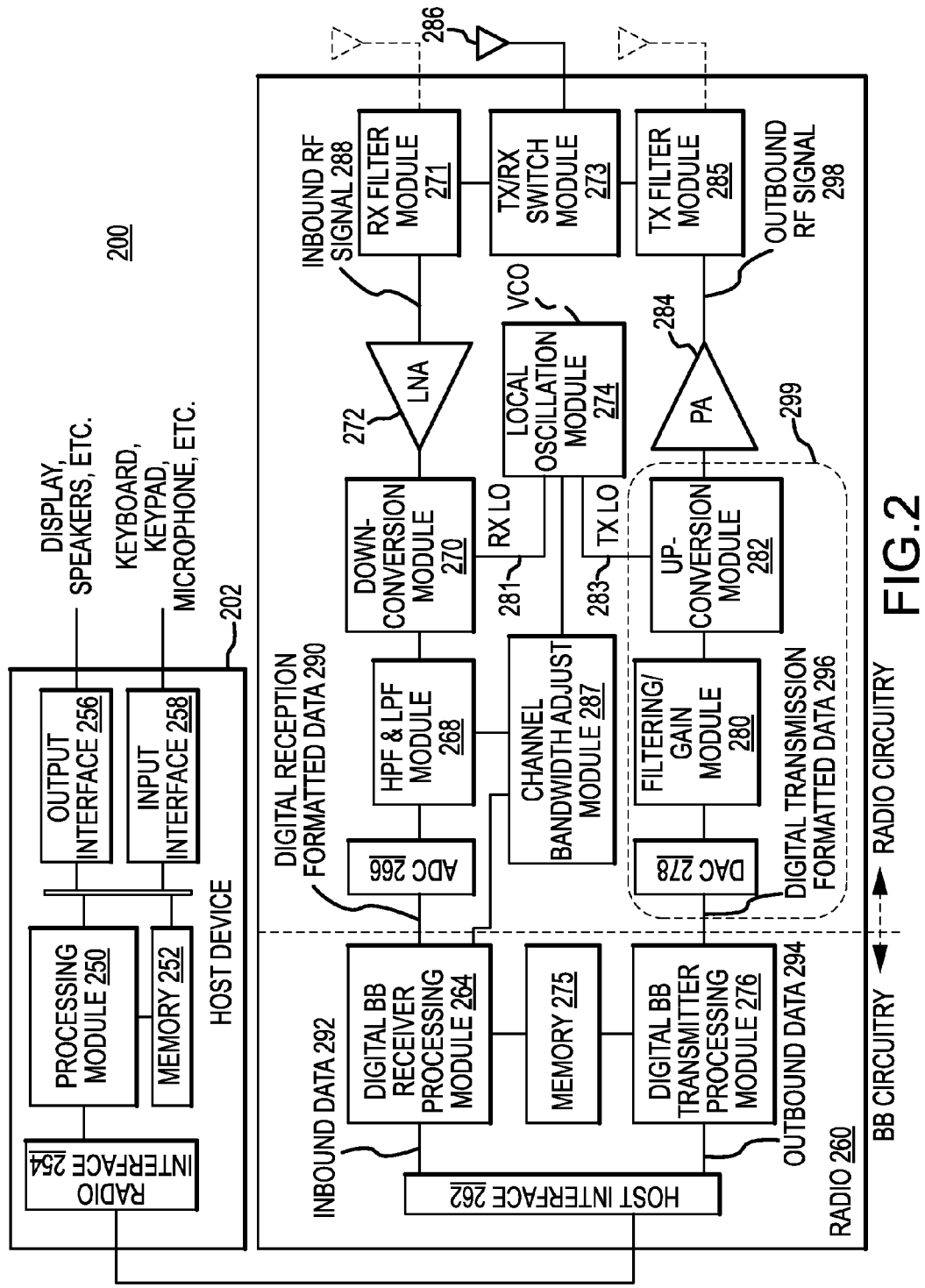
FIG. 2 is a diagram illustrating an example of a wireless communication device that includes a host device and an associated radio in accordance with one or more implementations.

FIG. 2 is a diagram illustrating a wireless communication device 200 that includes a host device 202 (e.g., wireless communication devices 118-132) and associated radio 260. For cellular telephone hosts, radio 260 is a built-in component. For personal digital assistants hosts, laptop hosts, and/or personal computer hosts, the radio 260 may be built-in or an externally coupled component.

As illustrated, host device 202 includes processing module 250, memory 252, radio interface 254, input interface 258, and output interface 256. Processing module 250 is configured to execute instructions stored in memory 275 to provide functions that can be performed by host device 202. For example, for a cellular telephone host device, processing module 250 performs the corresponding communication functions in accordance with a particular cellular telephone standard.

Radio interface 254 allows data to be received from and sent to radio 260. For data received from the radio 260 (e.g., inbound data), radio interface 254 provides the data to processing module 250 for further processing and/or routing to output interface 256. Output interface 256 provides connectivity to an output display device such as a display, monitor, or speakers, such that the received data may be presented. Radio interface 254 also provides data from processing module 250 to radio 260. Processing module 250 may receive the outbound data from an input device such as a keyboard, keypad, or microphone via input interface 258 or generate the data itself. For data received via input interface 258, processing module 250 may perform a corresponding host function on the data and/or route it to radio 260 via radio interface 254.

Radio 260 includes host interface 262, digital baseband (BB) receiver processing module 264, analog-to-digital converter 266, high pass and low pass filter module 268, inter-frequency (IF) mixing down conversion stage 270, receiver filter module 271, low noise amplifier 272, transmitter/receiver switch 273, local oscillation module 274 (which may be implemented, at least in part, using a voltage controlled oscillator (VCO)), memory 275, digital BB transmitter processing module 276, radio transmitter circuit 299, transmitter filter module 285, channel bandwidth adjust module 287, and antenna 286. In one or more aspects, radio transmitter circuit 299 includes digital-to-analog converter 278, filtering/gain module 280, intermediate frequency (IF) mixing up-conversion module 282, and power amplifier 284. Antenna 286 may be a single antenna that is shared by the transmit and receive paths as regulated by Tx/Rx switch module 273, or may include separate antennas for the transmit path and receive path. The antenna implementation will depend on the particular standard to which the wireless communication device is compliant.

Digital receiver processing module 264 and digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion.

Digital receiver and transmitter processing modules 264 and 276 may be implemented using a shared processing device, individual processing devices, or multiple processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 275 may be a single memory device or multiple memory devices. Such a memory device may be a read-only memory, random access memory, volatile memory, non-volatile memory, static memory, dynamic memory, flash memory, and/or any device that stores digital information. Note that when processing module 264 and/or 276 implements one or more of its functions via a state machine, analog circuitry, digital circuitry, and/or logic circuitry, the memory storing the corresponding operational instructions is embedded with the circuitry including the state machine, analog circuitry, digital circuitry, and/or logic circuitry.

In operation, radio 260 receives outbound data 294 from host device 202 via host interface 262. Host interface 262 routes outbound data 294 to digital transmitter processing module 276, which processes outbound data 294 in accordance with a particular wireless communication standard (e.g., IEEE 802.11, Bluetooth, ZigBee, WiMAX (Worldwide Interoperability for Microwave Access), or any other type of radio frequency based network protocol and/or variations thereof) to produce digital transmission formatted data 296. Outbound baseband signals 296 can be digital base-band signals (e.g., have a zero IF) or digital low IF signals, where the low IF can be in the frequency range of one hundred kHz (kilo-Hertz) to a few MHz (Mega-Hertz).

Digital-to-analog converter 278 converts outbound baseband signals 296 from the digital domain to the analog domain. Filtering/gain module 280 filters and/or adjusts the gain of the analog signals prior to providing the signals to up-conversion module 282. Up-conversion module 282 converts the analog baseband or low IF signals into radio frequency (RF) signals based on transmitter local oscillation 283 provided by local oscillation module 274. Power amplifier 284 amplifies the RF signals to produce outbound RF signals 298, which are filtered by transmitter filter module 285. Antenna 286 transmits outbound RF signals 298 to a targeted device such as a base station, an access point and/or another wireless communication device.

Radio 260 also receives inbound RF signals 288 via antenna 286, which are transmitted by a base station, an access point, or another wireless communication device. Antenna 286 provides inbound RF signals 288 to receiver filter module 271 via Tx/Rx switch 273, where Rx filter 271 bandpass filters inbound RF signals 288. Rx filter 271 provides the filtered RF signals to low noise amplifier 272, which amplifies inbound RF signals 288 to produce amplified inbound RF signals. Low noise amplifier 272 provides the amplified inbound RF signals to IF mixing module 270, which directly converts the amplified inbound RF signals into an inbound low IF signals or baseband signals based on receiver local oscillation 281 provided by local oscillation module 274. Down conversion module 270 provides the inbound low IF signals or baseband signals to filtering/gain module 268. High pass and low pass filter module 268 filters, based on settings provided by channel bandwidth adjust module 287, the inbound low IF signals or the inbound baseband signals to produce filtered inbound signals.

Analog-to-digital converter 266 converts the filtered inbound signals from the analog domain to the digital domain to produce digital reception formatted data 290, where inbound baseband signals 290 will be digital base-band signals or digital low IF signals, where the low IF typically will be in the frequency range of one hundred kHz to a few MHz. Digital receiver processing module 264, based on settings provided by channel bandwidth adjust module 287, decodes, descrambles, demaps, and/or demodulates inbound baseband signals 290 to recapture inbound data 292 in accordance with the particular wireless communication standard being implemented by radio 260. Host interface 262 provides recaptured inbound data 292 to host device 202 via radio interface 254.

Wireless communication device 200 may be implemented using one or more integrated circuits. For example, the host device 202 may be implemented on a first integrated circuit, digital receiver processing module 264, digital transmitter processing module 276 and memory 275 may be implemented on a second integrated circuit, and the remaining components of radio 260, less antenna 286, may be implemented on a third integrated circuit. Alternatively, radio 260 may be implemented on a single integrated circuit. As yet another example, processing module 250 of host device 202 and digital receiver and transmitter processing modules 264 and 276 may be a common processing device implemented on a single integrated circuit. Further, memory 252 and memory 275 may be implemented on a single integrated circuit and/or on the same integrated circuit as the common processing modules of processing module 250 and digital receiver and transmitter processing module 264 and 276.

Any of the various embodiments of the wireless communication device 200 that may be implemented within various communication systems can incorporate functionality to perform communication via more than one standard, protocol, or other predetermined means of communication. For example, the wireless communication device 200 implemented as a single communication device, can include functionality to perform communication in accordance with a first protocol, a second protocol, and/or a third protocol. These various protocols may be WiMAX (Worldwide Interoperability for Microwave Access) protocol, a protocol that complies with a wireless local area network (e.g., WLAN/WiFi) (e.g., one of the IEEE (Institute of Electrical and Electronics Engineer) 802.11 protocols such as 802.11a, 802.11b, 802.11g, 802.11n, or 802.11ac), a Bluetooth protocol, or any other predetermined means by which wireless communication may be effectuated.

Figure 3:
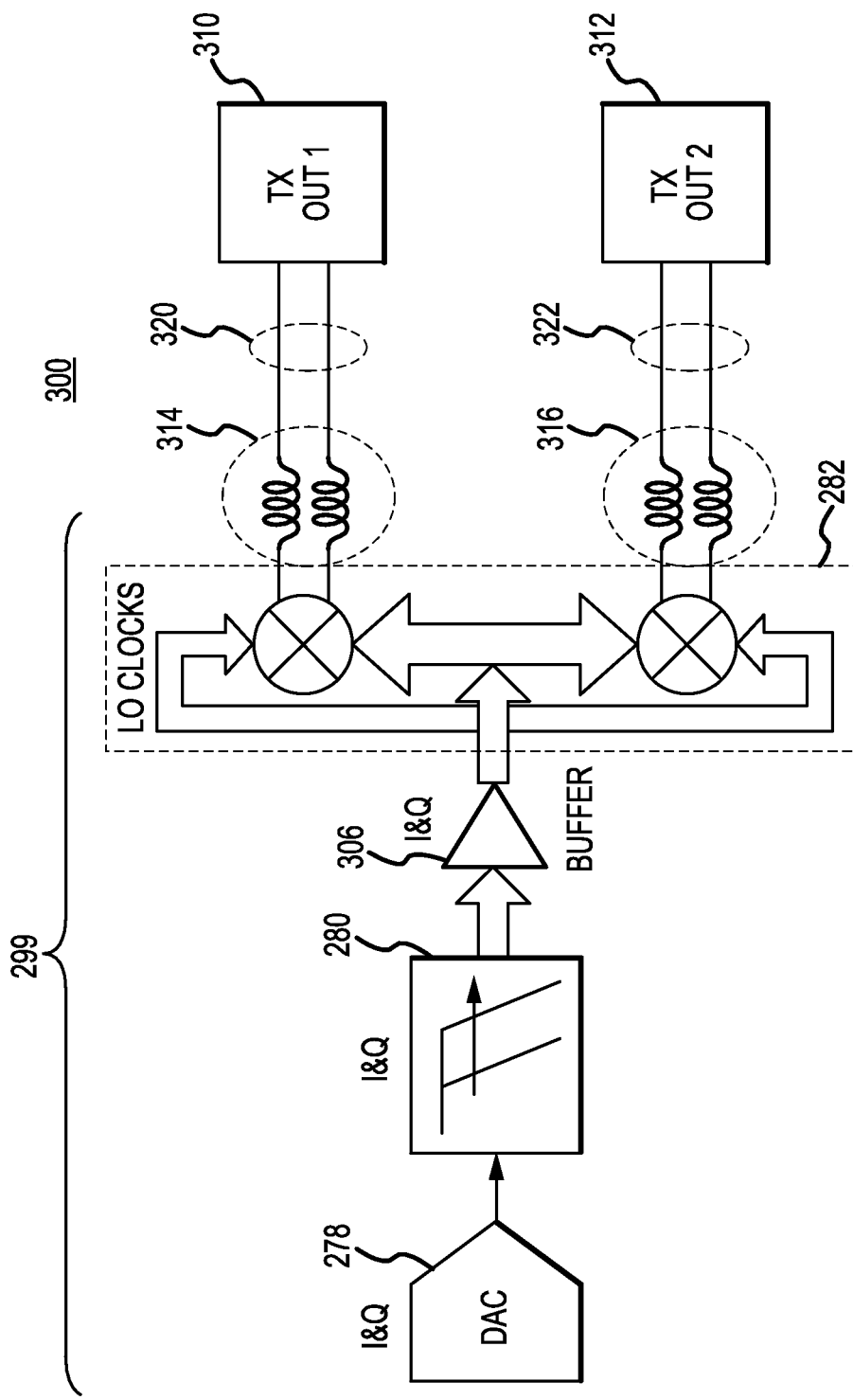
FIG. 3 conceptually illustrates an example of a transmitter circuit of the wireless communication device in FIG. 2 according to one or more implementations.

FIG. 3 conceptually illustrates an example of transmitter circuit 300 of wireless communication device 200 in FIG. 2 according to one or more implementations. Transmitter circuit 300 can be configured to transmit radio frequency (RF) signals, for example, for use in a mobile device such as a mobile telephone.

In the implementation depicted in FIG. 3, note that transmitter circuit 300 can represent a differential transceiver architecture that transmits differential RF signals carrying differential In-phase (I) signals and Quadrature-phase (Q) signals. In this regard, each of the differential I and Q component signals is composed of positive and negative signals (e.g., I+, I−, Q+, Q−). Transmitter circuit 300 can include multiple DACs, filters and/or mixers, for carrying the differential I and Q signals on separate signal paths. In some aspects, transmitter circuit 300 can represent a single-ended transceiver architecture for carrying single-ended I and Q signals.

For each component signal path, transmitter circuit 300 includes DAC 278, filtering/gain module 280, buffer 306, and up-conversion module 282. Each component signal path leading to the input of up-conversion module 282 may carry baseband frequency signals or intermediate frequency (IF) signals. Each component signal path deriving from the output of up-conversion module 282 may carry radio frequency signals. As shown in FIG. 3, first and second baseband signal paths include filtering/gain module 280 coupled to an output of DAC 278 and a buffer coupled to an output of filtering/gain module 280. Note that DAC 278, filtering/gain module 280 and up-conversion module 282 are included in radio transmitter circuit 299 of FIG. 2.

In one or more aspects, up-conversion module 282 includes passive mixers having interconnections between them that enable full utilization of the clock cycle. That is, the I and Q component signals pass through the passive mixers during each phase of the clock cycle. By way of example, two passive mixers may be interconnected with differential I and Q component signals such that a first passive mixer outputs an up-converted I component differential signal during a first phase of the clock cycle while a second passive mixer outputs an up-converted Q component differential signal during the same phase. In this respect, the passive mixer network allows switch outputs for each component signal to be available for transmission during each phase of the clock cycle.

Each passive mixer of up-conversion module 282 may be configured to receive the differential I and Q component signals. In addition, each of the passive mixers may be configured to receive the same clock signals configured with the same duty cycle (sometimes referred to as a clock phase). For example, a clock generator, represented as local oscillation module 274 of FIG. 2, may generate four local oscillator (LO) clock signals, each delay-shifted by one-fourth of the clock cycle. In some aspects, the number of LO clock signals may increase to 8 or 16. In this respect, the relationship between the number of passive mixers and the number of LO clock signals is 1 to 2 (or 1:2). In other words, there is a passive mixer for every two LO clock signals generated.

In one or more aspects, up-conversion module 282 is coupled to transmission output modules 310 and 312 via respective radio frequency signal paths 320 and 322. By way of example, transmission output module 310 may include a power amplifier pad (PAD) and/or a power amplifier (PA). In this respect, up-conversion module 282 may be coupled to an input of the PAD. In some aspects, the PAD may not be part of transmission output module 310. As such, an output of the PAD may be coupled to an input of the PA, via interface 314 on a first radio frequency signal path. Similarly, up-conversion module 282 may be coupled to an input of another PAD and an output of another PA via interface 316 on a second radio frequency signal path.

Furthermore, transmission output modules 310 and 312 may be coupled to a respective antenna, or in the alternative, may be collectively coupled to a same antenna. As such, an output of the PA may be coupled to an antenna. By way of illustration without limiting the scope of the subject disclosure, an analog RF signal can be prepared for transmission by first being provided to DAC 278, converted to a digital signal at the output of DAC 278, and then provided to filtering/gain module 280. Filtering/gain module 280 can include a low-pass filter for removing high frequency components of the digital baseband or IF signal. The filtered signal can then be provided to up-conversion module 282, via buffer 306. A buffer stage, such as that provided by buffer 306, may be required to provide a lower output resistance/impedance (e.g., a lower $R_{OUT}$) to drive a first passive mixer included in up-conversion module 282. As will be discussed further below, up-conversion module 282 may be composed of multiple passive mixers, where each passive mixer is disposed on a respective signal path. At the first passive mixer, frequency conversion is performed on the baseband signals and it is output to transmission output module 310.

Depending on implementation, DAC 278, filtering/gain module 280, up-conversion module 282 and transmission output modules 310 and 312 may be integrated onto a single chip or die. The integrated components can be implemented using system-on-chip (SOC) and configured to provide a standardized PAD output, for example, to enable the interchangeability with off-chip components. Off-chip component parts, such as the PA, may be supplied by various third-party vendors and implemented using gallium arsenide (GaAs). To facilitate the interchangeability with off-chip components, transmitter circuit 300 and particularly the PAD can be configured to operate with an interface (e.g., interfaces 314, 316) having a standardized impedance.

By way of example, the PAD can be configured to couple with interface 314 having an impedance between 45 and 55 ohms. In certain implementations, the PAD may be configured to drive an interface (e.g., interface 314) having an impedance of about 50 ohms. Although GaAs implementations are generally more efficient than silicon-on-insulation (SOI), the overall power characteristics of radio 260 can be improved if power amplification components are repartitioned and implemented using SOI.

In one or more aspects, the PAD can be implemented on one or more discrete components (e.g., chips or dies) that are separate from transmitter circuit 300. For example, transmitter circuit 300 may be implemented using system-on-chip (SOC) and configured to reside on a separate chip or die from that of the PA, which is implemented using SOI. In some implementations, the PA may be integrated onto transmitter circuit 300 and implemented using SOC. As noted above, although SOI is less efficient than GaAs (as is commonly used in off-chip power amplifier implementations, such as the PA), the efficiency gained by eliminating the PAD, can improve the overall efficiency of transmitter circuit 300. Thus, the configuration of transmitter circuit 300, which includes a repartitioned power amplifier, can provide improved power efficiency with respect to the transceiver architecture described above with respect to FIG. 1.

Figure 4:
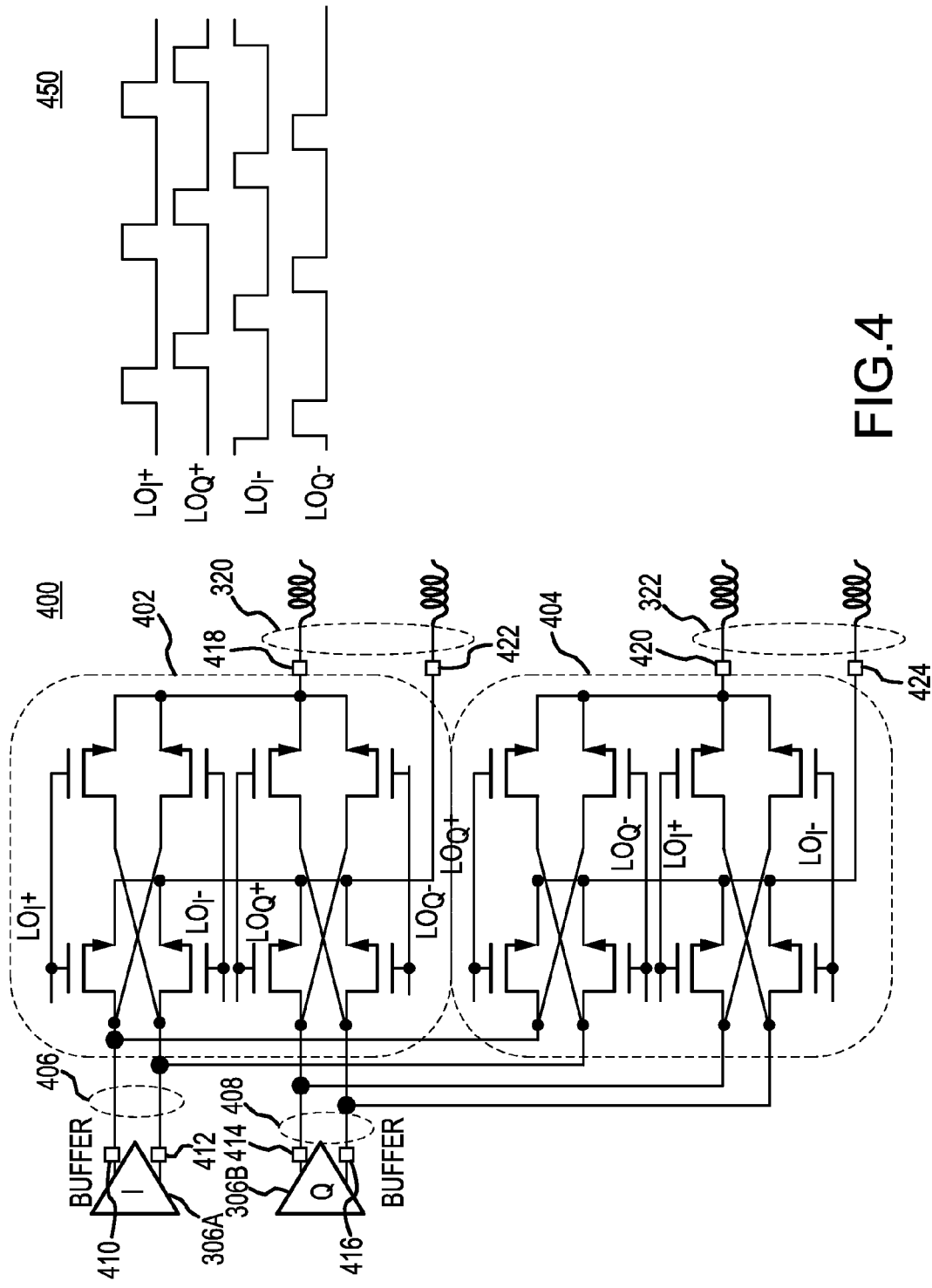
FIG. 4 is a schematic diagram illustrating an example of a passive mixer included in the transmitter circuit of FIG. 3 according to one or more implementations.

FIG. 4 is a schematic diagram illustrating an example of passive mixer 400 included in transmitter circuit 300 of FIG. 3 according to one or more implementations. Passive mixer 400 includes a schematic of interconnected passive mixers.

In some aspects, transmitter circuit 300 includes a separate signal path for each component signal. Each signal path may include a digital-to-analog converter (not shown), an anti-aliasing low-pass filter (not shown), and buffer 306. The anti-aliasing low-pass filter may be coupled to an output of the digital-to-analog converter, and buffer 306 may be coupled to an output of the anti-aliasing low-pass filter. Each of the elements along the signal path are configured to receive and output differential signals of a corresponding component (e.g., I, Q).

Timing diagram 450 includes waveforms of local oscillation clock signals generated by local oscillation module 274. Each LO clock signal waveform is shifted in phase and each corresponds to a respective phase in the clock cycle. By way of example, if the clock cycle include four clock phases, then each waveform is shifted in phase by 25% (or one-fourth of the clock cycle). Conversely, the number of LO clock signals is equivalent to the number of phases in the clock cycle. As such, a four-phase clock cycle would include four LO clock signals, each having a duty cycle that is one-fourth of the clock cycle.

As shown in FIG. 4, passive mixer 400 includes passive mixers 402 and 404. In a four-phase clock cycle (e.g., 25% duty cycle), passive mixers 402 and 404 may be coupled to an output of a respective buffer. In this respect, passive mixer 402 is coupled to an output of buffer 306A via differential signal path 406 corresponding to the I component signal path. Similarly, passive mixer 404 is coupled to an output of buffer 306B via differential signal path 408 corresponding to the Q component signal path. Passive mixers 402 and 404 can produce a respective differential output during each phase of the clock cycle based on the shared LO clock signals.

As shown in FIG. 4, passive mixer 400 may be an interconnection of passive mixers. In this respect, passive mixer 400 may include first positive input 410, first negative input 412, second positive input 414 and second negative input 416. The first positive and negative inputs 410 and 412 may receive differential signal path 406. The second positive and negative inputs 414 and 416 may receive differential signal path 408.

Passive mixer 400 also may include N positive output instances and N negative output instances, where N is a positive even integer. By way of example, a first instance of the N positive and negative outputs (e.g., outputs 418 and 422) may output to radio frequency signal path 320. A second instance of the N positive and negative outputs (e.g., outputs 420 and 424) may output to radio frequency signal path 322. As such, the N positive and negative output instances are scalable depending on the number of passive mixers employed in transmitter circuit 300.

Passive mixers 402 and 404 respectively include a first switch, a second switch, a third switch, a fourth switch, a fifth switch, a sixth switch, a seventh switch, and an eighth switch. In some aspects, the first and second switches are a first pairing, the third and fourth switches are a second pairing, the fifth and sixth switches are a third pairing, and the seventh and eighth switches are a fourth pairing.

In one or more aspects, first positive input 410 is coupled to a drain node of the first and fourth switches of respective ones of the N passive mixer instances. In one or more aspects, first negative input 412 is coupled to a drain node of the second and third switches of respective ones of the N passive mixer instances. In one or more aspects, second positive input 414 is coupled to a drain node of the fifth and eighth switches of respective ones of the N passive mixer instances. In one or more aspects, second negative input 416 is coupled to a drain node of the sixth and seventh switches of respective ones of the N passive mixer instances.

In some implementations, the N positive output instances are coupled to a source node of the second, fourth, sixth and eighth switches of respective ones of the N passive mixer instances. Similarly, the N negative output instances are coupled to a source node of the first, third, fifth and seventh switches of respective ones of the N passive mixer instances.

The N passive mixer instances of the passive mixer 400 are configured to up-convert the I and Q component signals from a baseband frequency to a radio frequency based on a clock cycle. The passive mixer receives multiple phase-shifted LO clock signals having the same clock cycle. The up-converted version of the I and Q component signals can be output from the N passive mixers during each phase of the clock cycle.

In one or more aspects, the first and second switches of respective ones of the N passive mixer instances are coupled to a first clock node. In one or more aspects, the third and fourth switches of respective ones of the N passive mixer instances are coupled to a second clock node. In one or more aspects, the fifth and sixth switches of respective ones of the N passive mixer instances are coupled to a third clock node. In one or more aspects, the seventh and eighth switches of respective ones of the N passive mixer instances are coupled to a fourth clock node.

In one or more implementations, the N passive mixer instances are configured to receive a same local oscillator clock signal via a respective one of the first, second, third and fourth clock nodes when N equals 2. In one or more implementations, the N passive mixer instances are configured to receive a different local oscillator clock signal via the respective one of the first, second, third and fourth clock nodes when N is greater than 2.

As described above with respect to FIGS. 3 and 4, the first outbound signal may contain a differential in-phase (I) modulation signal and the second outbound signal may contain a differential quadrature (Q) modulation signal. In this respect, first positive input 410 and first negative input 412 of passive mixer 400 may be configured to receive the differential I modulation signal. Similarly, second positive input 414 and second negative input 416 of passive mixer 400 may be configured to receive the differential Q modulation signal.

In some aspects, the N positive output instances and the N negative output instances may be configured to form differential output pairings, in which each of the differential output pairings is associated with a respective one of the radio frequency signal paths 320 and 322.

In some aspects, each pair of switches is configured to receive a different LO clock signal. In this respect, the pair of switches is configured to receive the same LO clock signal at a respective gate node of the switch. Each switch may be configured as an NFET or a PFET, depending on implementation.

Figure 5:
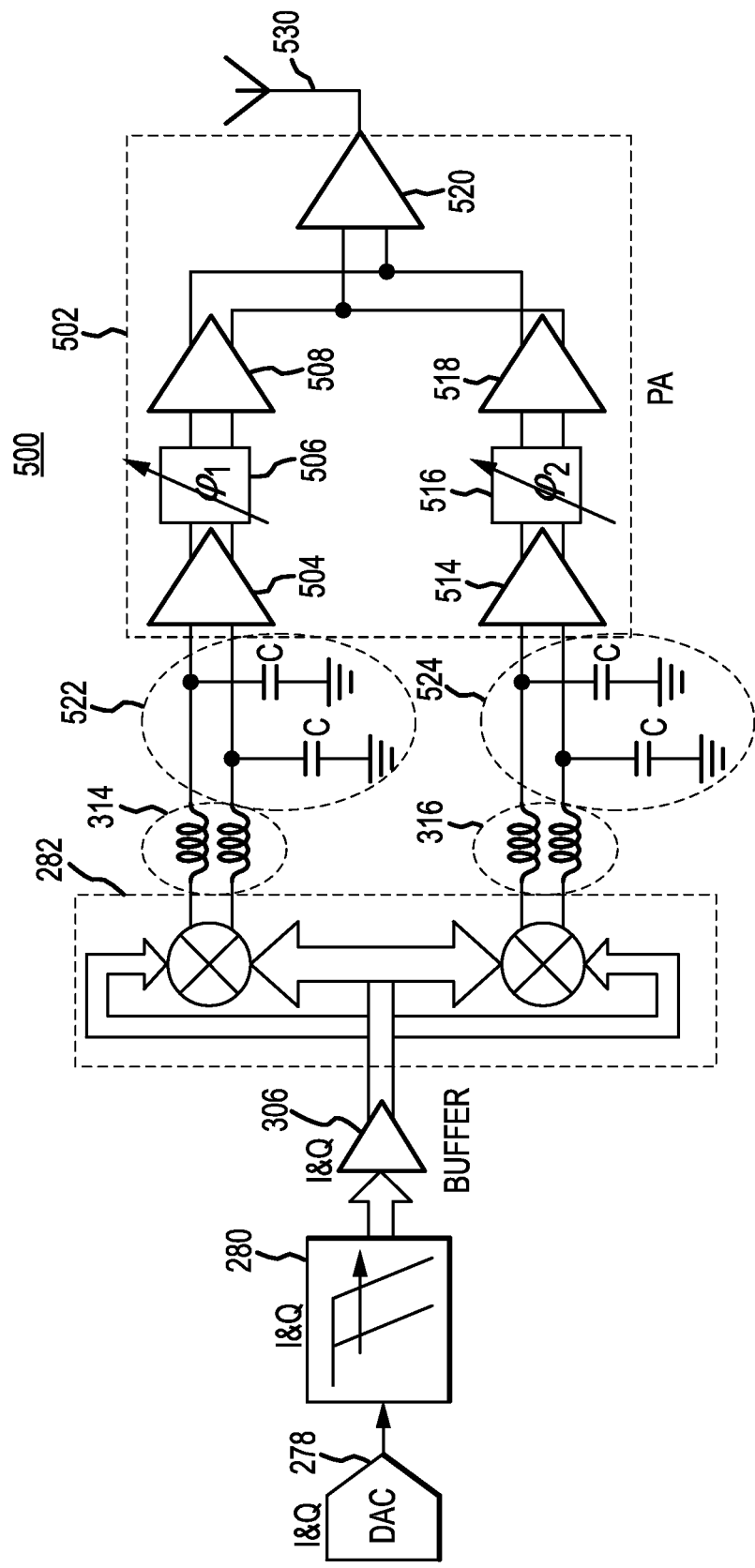
FIG. 5 conceptually illustrates an example of a transmitter circuit with phase shifting according to one or more implementations.

FIG. 5 conceptually illustrates an example of a transmitter circuit 500 with phase shifting according to one or more implementations. Transmitter circuit 500 is substantially similar to transmitter circuit 300 as described above, therefore, only differences will be described in further detail.

Transmitter circuit 500 can be used to send and receive radio frequency (RF) signals, for example, for use in a mobile device such as a mobile telephone. Transmitter circuit 500 includes digital-to-analog converter (DAC) 278, filtering/gain module 280, buffer 306, and up-conversion module 282. As illustrated, transmitter circuit 500 further includes power amplifier (PA) 502, and antenna 530.

Although PA 502 is illustrated as having multiple stages of power amplification (e.g., three power amplification components), it is understood that PA 502 may include a greater (or lesser) number of power amplification stages, depending on implementation.

In some implementations, transmitter circuit 500 employs passive mixers on respective signal paths for transmission combining via the multiple stages of PA 502. In some aspects, PA 502 is coupled to outputs of passive mixers included in up-conversion module 282. Each output from up-conversion module 282 may be coupled to a respective radio frequency signal path (e.g., differential signal paths 320, 322). In some aspects, a phase shifter is coupled between the first power amplifier and the second power amplifier, in which the phase shifter is configured to shift a carrier component of a respective radio frequency signals path by a defined phase.

By way of illustration, if transmitter circuit 500 employs N passive mixers, there are N radio frequency signal paths that respectively include a first power amplifier coupled to a respective one of the N passive mixers and a second power amplifier coupled to the first power amplifier. In this respect, first power amplifier 504 is coupled to second power amplifier 508 via phase shifter 506 on a first radio frequency signal path that is coupled to a first passive mixer included in up-conversion module 282. In addition, first power amplifier 514 is coupled to second power amplifier 518 via phase shifter 516 on a second radio frequency signal path that is coupled to a second passive mixer included in up-conversion module 282.

PA 502 includes third power amplifier 520 coupled to the N radio frequency signal paths via second power amplifiers 508 and 518. In addition, antenna 530 is coupled to the third power amplifier, in which third power amplifier 520 is configured to combine the N radio frequency signals into a common transmission signal and output to antenna 530.

In some aspects, phase shifters may be employed on respective signal paths to synchronize the RF signaling between differential signal paths 320 and 322 before combining. By way of example, the RF outputs on each path deriving from a respective passive mixer may be 90 degrees out-of-phase of one another (e.g., differential signal path 320 is +45 degrees and differential signal path 322 is −45 degrees. As such, a first phase shifter may be configured to adjust the phase of differential signal path 320 by a number of degrees. Similarly, a second phase shifter may be configured to adjust differential signal path 322 by the same number of degrees such that their constructive sum is zero. In effect, the phase adjustment synchronizes differential signal paths 320 and 322.

As shown in FIG. 5, phase shifters 506 and 516 are located between first and second stages of PA 502. In some aspects, phase shifters 506 and 516 may be located before the first stage of PA 502. In some aspects, phase shifters 506 and 516 may be located between the second and third stages of PA 502.

In one or more implementations, a capacitance coupled to ground may be realized (e.g., capacitance networks 522 and 524) each differential input to PA 502.

In addition, interfaces 314 and 316 may be implemented as bond wiring to connect the front-end portion of the transceiver (e.g., DAC, LPF, buffer, passive mixers) to the multi-stage power amplifier (e.g., PA 502) that may use a different technology (e.g., CMOS to Silicon-on-Insulation (SOI)). In some aspects, the first and second power amplifiers of respective ones of the N radio frequency signal paths may be formed on a same die. In this respect, the N passive mixers may be formed on a first die and the N radio frequency signal paths may be formed on a second die, in which the first die is complementary metal-oxide-semiconductor (CMOS) and the second die is silicon-on-insulation (SOI).

Figure 6:
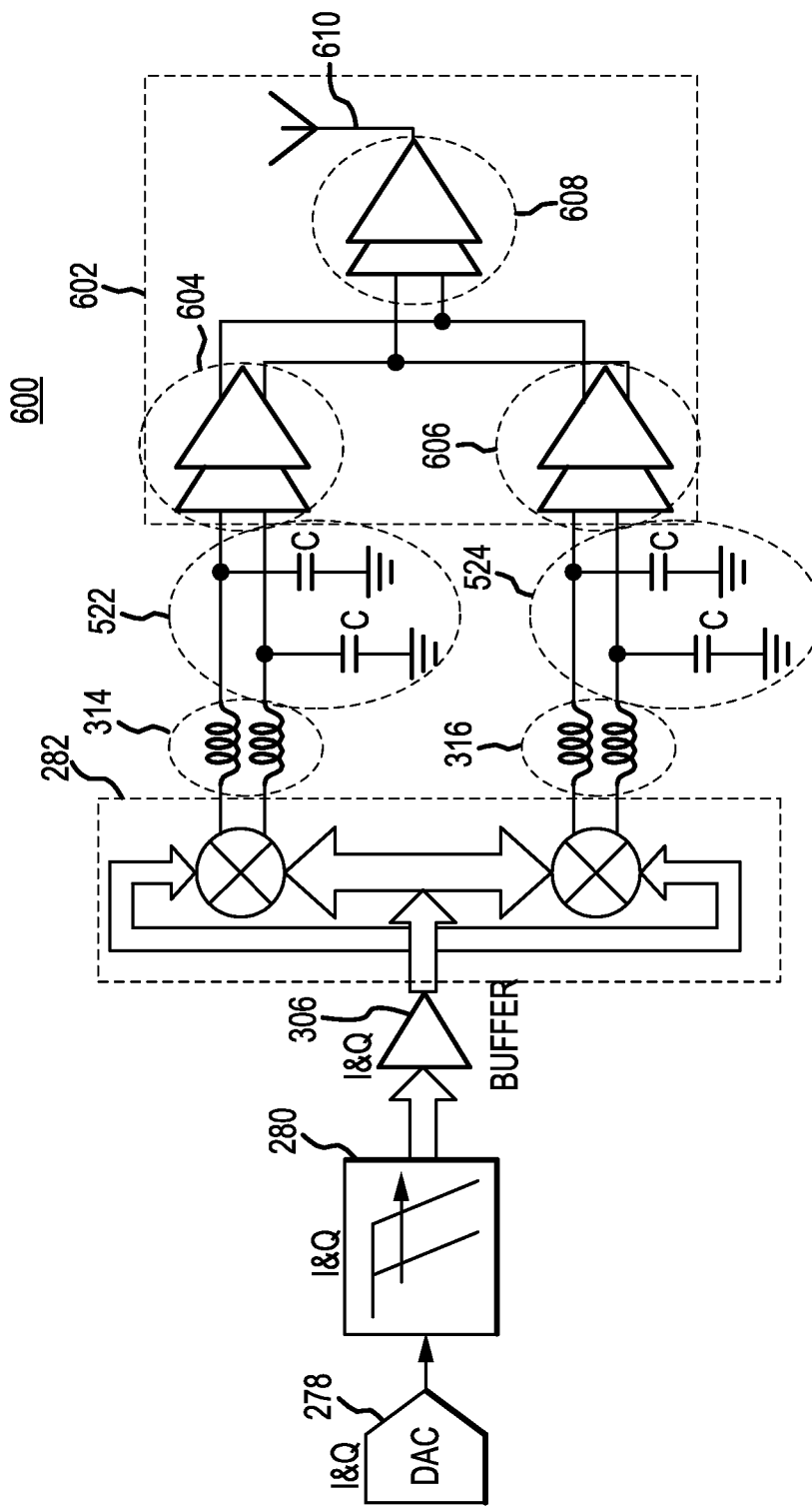
FIG. 6 conceptually illustrates another example of a transmitter circuit according to one or more implementations.

FIG. 6 conceptually illustrates another example of transmitter circuit 600 according to one or more implementations. Transmitter circuit 600 is substantially similar to transmitter circuit 500 as described above, therefore, only differences will be described in further detail.

In comparison to transmitter circuit 500, the multi-stage power amplifier (e.g., PA 602) synchronizes the outbound RF signals on the respective RF signal paths irrespective of any phase-shifting. In this respect, the respective signal paths may be kept out-of-phase and may experience a loss in gain (e.g., −3 dB) compared to the implementation using phase-shifters.

Transmitter circuit 500 can be used to send and receive radio frequency (RF) signals, for example, for use in a mobile device such as a mobile telephone. Transmitter circuit 500 includes digital-to-analog converter (DAC) 278, filtering/gain module 280, buffer 306, and up-conversion module 282. As illustrated, transmitter circuit 500 further includes power amplifier (PA) 602, and antenna 610.

In one or more implementations, a capacitance coupled to ground may be realized (e.g., capacitance networks 522 and 524) each differential input to PA 602. In addition, interfaces 314 and 316 may be implemented as bond wiring to connect the front-end portion of the transceiver (e.g., DAC, LPF, buffer, passive mixers) to the multi-stage power amplifier (e.g., PA 602) that may use a different technology.

In one or more aspects, PA 602 is composed of a first stage, a second stage and a third stage. PA 602 is coupled to N radio frequency signal paths via the third stage, in which the N radio frequency signal paths respectively include the first stage and the second stage of PA 602. The third stage of PA 602 may be configured to combine the N radio frequency signal paths into a common transmission signal. Antenna 610 is coupled to the third stage of PA 602 and configured to receive the common transmission signal from the third stage of PA 602. In some aspects, each stage of PA 602 may include one or more power amplifiers coupled in series.

Figure 7:
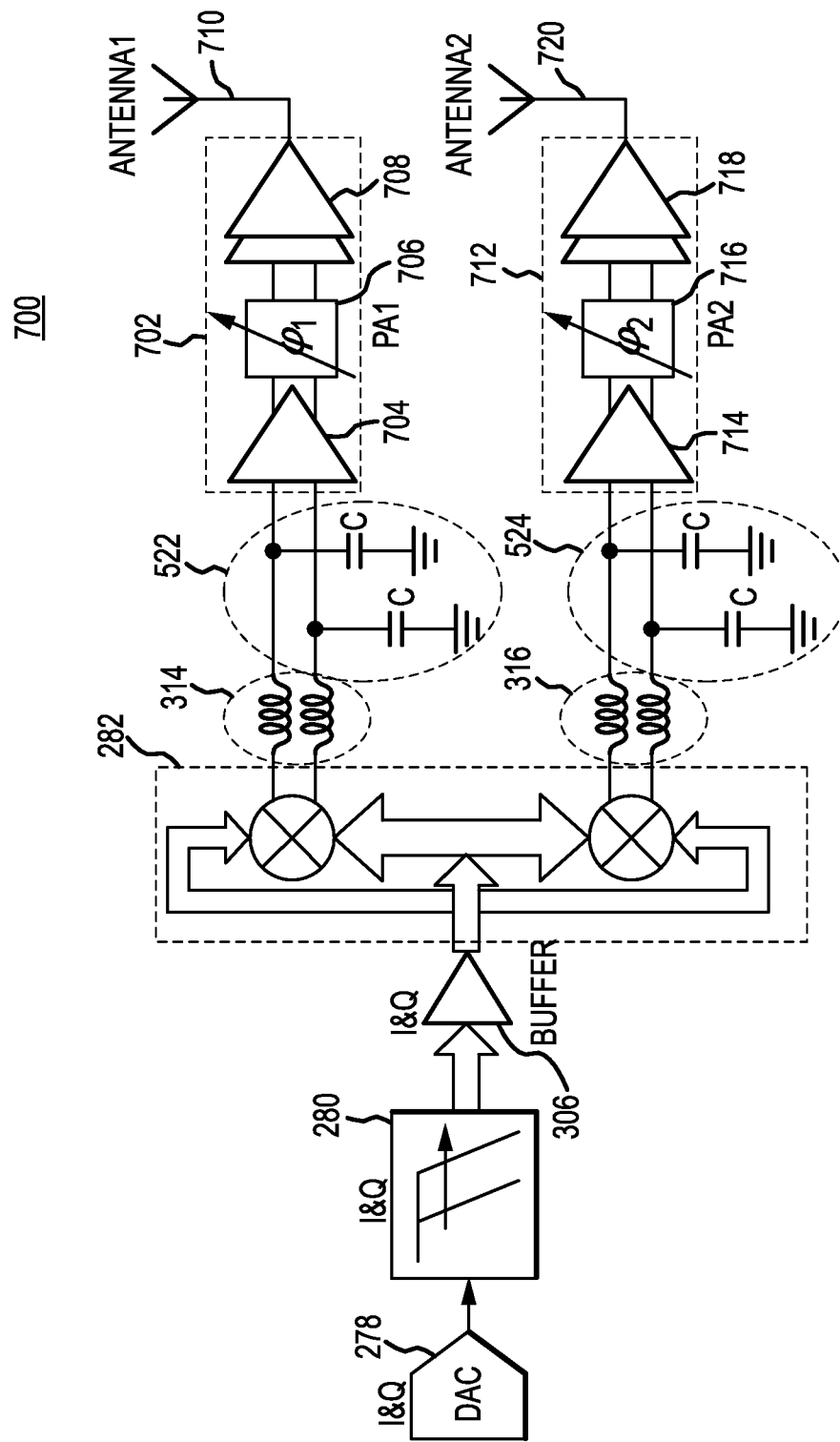
FIG. 7 conceptually illustrates an example of a transmitter circuit according to one or more implementations.

FIG. 7 conceptually illustrates an example of transmitter circuit 700 according to one or more implementations. Transmitter circuit 700 is substantially similar to transmitter circuit 500 as described above, therefore, only differences are to be described in further detail.

In comparison to transmitter circuit 500, the multi-stage power amplifier (e.g., PA 702) outputs outbound RF signals on respective RF signal paths irrespective of any power combining. Rather, the individual RF signal paths can be implemented as beam-forming paths that can shape a transmission signal with maximum power to a targeted receiver.

In some implementations, transmitter circuit 700 employs multiple passive mixers connected to respective antennas for multiple-in multiple-out (MIMO) beam-forming. Using the multiple passive mixers that fully utilize the clock cycle, full utilization of the baseband current for beam-forming can be realized. Like the implementation in FIG. 5 that employs phase shifters, each respective RF signal path has a respective phase shifter (e.g., phase shifters 706 and 716). In this regard, each phase shifter can be adjusted irrespective of the other phase shifter to increase the degree of beam-forming to the targeted receiver. As such, each RF signal path may be kept out-of-phase of the other RF signal path.

Here, both RF signal paths have the same modulation signal, but the carrier signals are out of phase. In addition, respective multi-stage power amplifiers (e.g., power amplifiers 704 and 708) are coupled to an output of respective passive mixers, in which the respective multi-stage power amplifiers are coupled to a respective antenna (e.g., antenna 710). Similarly, by way of illustration, power amplifiers 714 and 718 are coupled to antenna 720 via phase shifter 716.

Figure 8:
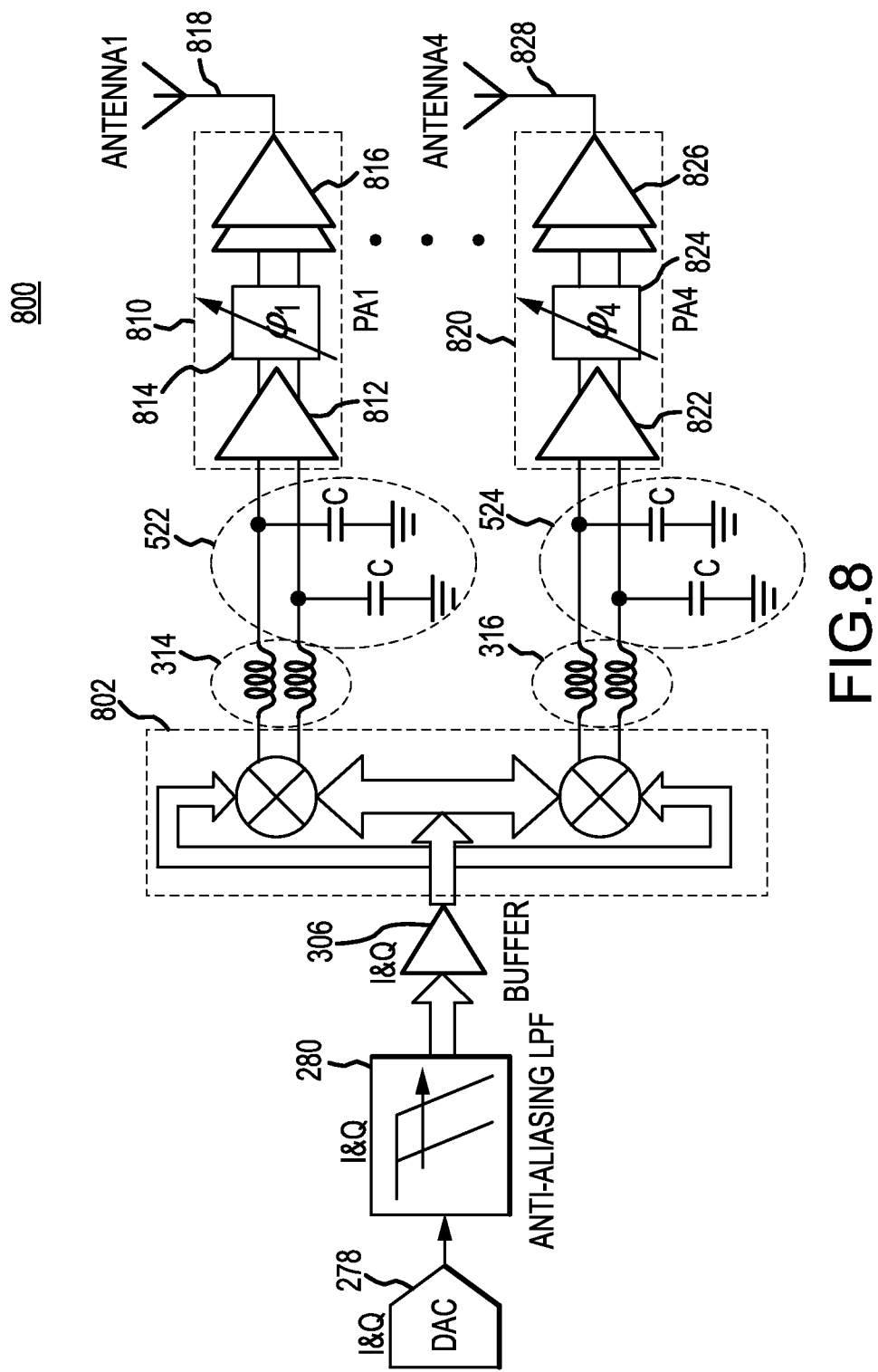
FIG. 8 conceptually illustrates another example of a transmitter circuit according to one or more implementations.

FIG. 8 conceptually illustrates an example of transmitter circuit 800 according to one or more implementations. Transmitter circuit 800 is substantially similar to transmitter circuit 700 as described above, therefore, only differences are to be described in further detail.

In comparison to transmitter circuit 700, the number of RF signal paths stages increased from two to four. Rather than implementing a clock cycle with four phases, a clock cycle with eight phases is employed. As such, four passive mixers are implemented to provide full utilization of switch outputs during each phase of the clock cycle. In some aspects, the number of phases employed can be sixteen, in which eight passive mixers are implemented to provide full utilization of switch outputs during each phase of the clock cycle.

In some implementations, the number of passive mixers employed in up-conversion module 282 can increase based on the number of phases formed in a clock cycle. In some aspects, the clock cycle can include eight phases (e.g., 12.5% duty cycle). As such, transmitter circuit 800 can be configured for beam-forming that utilizes the eight phases in the clock cycle. In this respect, transmitter circuit 800 employs four passive mixers, in which transmitter circuit 800 includes four respective RF signal paths.

Each RF signal path includes a multi-stage power amplifier (e.g., PA 810 and 820) coupled to a respective antenna (e.g., antennas 818 and 828). Here, transmitter circuit 800 includes PA 810 that is composed of first power amplifier 812, phase shifter 814 and second/third power amplifiers 816. Similarly, PA 820 includes first power amplifier 822, phase shifter 824 and second/third power amplifiers 826.

In this respect, buffer 306 for each I and Q component signal is coupled to an input of the four passive mixers. In turn, the output of each passive mixer feeds into a respective multi-stage power amplifier with phase-shifting and then to the respective antenna for transmission. In some aspects, transmitter circuit 800 may be implemented without any phase-shifting similar to the implementation discussed in FIG. 6.

Figure 9:
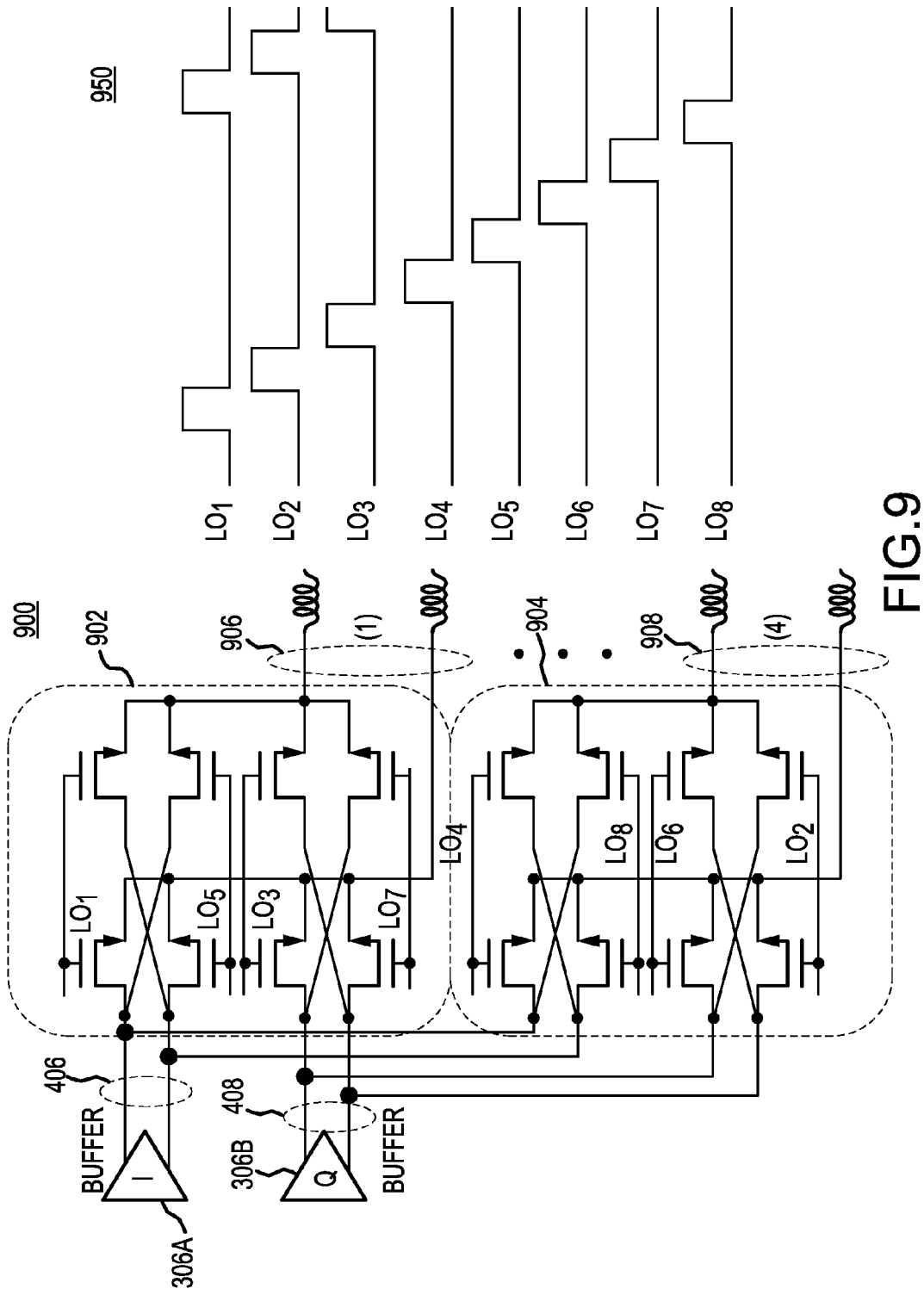
FIG. 9 is a schematic diagram illustrating an example of a passive mixer included in the transmitter circuit of FIG. 8 according to one or more implementations.

FIG. 9 is a schematic diagram illustrating an example of a passive mixer 900 included in the transmitter circuit 800 of FIG. 8 according to one or more implementations. Passive mixer 900 is substantially similar to passive mixer 400 as described above, therefore, only differences are to be described in further detail.

Timing diagram 950 includes waveforms of local oscillation clock signals generated by local oscillation module 274. Each LO clock signal waveform is shifted in phase and each corresponds to a respective phase in the clock cycle. By way of example, if the clock cycle include eight clock phases, then each waveform is shifted in phase by 12.5% (or one-eighth of the clock cycle). Conversely, the number of LO clock signals may be equivalent to the number of phases in the clock cycle. As such, an eight-phase clock cycle would include eight LO clock signals, each having a duty cycle that is one-eighth of the clock cycle. In some aspects, the clock cycle may have eight phases, each having a duty cycle that is one-sixteenth of the clock cycle. As such, local oscillator module 274 can generate sixteen LO clock signals.

As shown in FIG. 9, passive mixer 900 includes passive mixers 902 and 904. In an eight-phase clock cycle (e.g., 12.5% duty cycle), passive mixers 902 and 904 may be coupled to an output of a respective buffer. In this respect, passive mixer 902 is coupled to an output of buffer 306A via differential signal path 406 corresponding to the I component signal path. Similarly, passive mixer 904 is coupled to an output of buffer 306B via differential signal path 408 corresponding to the Q component signal path. Passive mixers 902 and 904 can produce a respective differential output during each phase of the clock cycle based on the shared LO clock signals.

In some aspects, each pair of switches is configured to receive a different LO clock signal. In this respect, the pair of switches is configured to receive the same LO clock signal at a respective gate node of the switch. Each switch may be configured as an NFET or a PFET, depending on implementation.

As used herein, the term "clock cycle" may refer to the period of time between clock transitions. By way of example, the clock period may be measured between the rising-edge (e.g., low to high) of each clock transition. Alternatively, the clock period may be measured between the falling-edge (e.g., high to low) of each clock transition. The term "clock phase" may refer to the duty cycle duration of the clock transition. By way of example, after a clock transitions from low to high, the signal may remain high for some duration before transition back from high to low. This duration defines the duty cycle (or sometimes referred to as the clock phase).

As used herein, the terms, chip, die, integrated circuit, semiconductor device, and microelectronic device, are applicable to the subject technology as these terms can be used interchangeably in the field of electronics. With respect to a chip, power, ground, and various signals may be coupled between them and other circuit elements via physical, electrically conductive connections. Such a point of connection may be referred to as an input, output, input/output (I/O), terminal, line, pin, pad, port, interface, or similar variants and combinations. Although connections between and amongst chips can be made by way of electrical conductors, chips and other circuit elements may alternatively be coupled by way of, but not limited to, optical, mechanical, magnetic, electrostatic, and electromagnetic interfaces.

The terms metal line, trace, wire, interconnect, conductor, signal path and signaling medium can be all related. The related terms listed above, can be interchangeable, and appear in order from specific to general. In the field of electronics, metal lines are sometimes referred to as traces, wires, lines, interconnect or simply metal. Metal lines, such as, but not limited to, aluminum (Al), copper (Cu), an alloy of Al and Cu, an alloy of Al, Cu and silicon (Si), tungsten (W), nickel (Ni), titanium nitride (TiN), and tantalum nitride (TaN) are conductors that provide signal paths for interconnecting electrical circuitry. Other conductors, both metal and non-metal are available in microelectronic devices. Materials such as doped polysilicon, doped single-crystal silicon (often referred to simply as diffusion, regardless of whether such doping is achieved by thermal diffusion or ion implantation), titanium (Ti), cobalt (Co), molybdenum (Mo), and refractory metal silicides are examples of other conductors.

FET refers to a metal-oxide-semiconductor field effect transistor (MOSFET). An re-channel FET is referred to herein as an NFET. A p-channel FET is referred to herein as a PFET. FETs that are formed in a bulk substrate, such as a silicon wafer, have four terminals, namely gate, drain, source and body. FETs can be formed in SOI substrates, and other various substrates with differential material types.

As used herein, "gate" may refer to an insulated gate terminal of a FET. The physical structure of the gate terminal is referred to as a gate electrode. In terms of the layout of an integrated circuit, the gate electrode is the logical AND of the polysilicon layer with the layer representing an active portion of the semiconductor surface.

Source/drain (S/D) terminals refer to the terminals of a FET, between which conduction occurs under the influence of an electric field, subsequent to the inversion of the semiconductor surface under the influence of an electric field resulting from a voltage applied to the gate terminal of the FET. Generally, the source and drain terminals of a FET are fabricated such that they are geometrically symmetrical. With geometrically symmetrical source and drain terminals, these terminals can be simply referred to as source/drain terminals, and this nomenclature is used herein. Designers often designate a particular source/drain terminal to be a "source" or a "drain" on the basis of the voltage to be applied to that terminal when the FET is operated in a circuit.

Substrate, as used herein, refers to the physical object that is the basic workpiece transformed by various process operations into the desired microelectronic configuration. A typical substrate used for the manufacture of integrated circuits is a wafer. Wafers, may be made of semiconducting (e.g., bulk silicon), non-semiconducting (e.g. glass), or combinations of semiconducting and non-semiconducting materials (e.g., silicon-on-insulator (SOI)). In the semiconductor industry, a bulk silicon wafer is a very commonly used substrate for the manufacture of integrated circuits.

Polycrystalline silicon is a nonporous form of silicon made up of randomly oriented crystallites or domains. Polycrystalline silicon is often formed by chemical vapor deposition from a silicon source gas or other methods and has a structure that contains large-angle grain boundaries, twin boundaries, or both. Polycrystalline silicon is often referred to as polysilicon, or sometimes more simply as poly. It is noted that polysilicon is commonly used to form the gate electrode of a FET. An alternative use of polysilicon is as a sacrificial gate electrode that is removed and replaced with a metal gate, or any other suitable material, during the manufacturing process.

In the semiconductor industry environment of foundries and fabless companies, it is the foundries that develop, specify and provide the physical structures that designers use to implement their designs. Foundries provide manufacturing services to many fabless semiconductor companies, but to operate profitably, they must optimize their manufacturing processes to achieve high yields. Such optimizations typically require that limitations be placed on the variety of structures that can be produced by a particular manufacturing process. Consistent with the foregoing, foundries typically provide a limited set of transistor structures that are intended to cover a broad range of circuit applications.

One or more implementations are performed by one or more integrated circuits, such as application specific integrated circuits (ASICs) or field programmable gate arrays (FPGAs). In one or more implementations, such integrated circuits execute instructions that are stored on the circuit itself. The terms "integrated circuit" and "semiconductor device" may include, but is not limited to, a design tool output file as binary code encompassing the overall physical design of the integrated circuit or semiconductor device, a data file encoded with code representing the overall physical design of the integrated circuit or semiconductor device, a packaged integrated circuit or semiconductor device, or an unpackaged die. The data file can include elements of the integrated circuit or semiconductor device, interconnections of those elements, and timing characteristics of those elements (including parasitics of the elements).

The various illustrative blocks, elements, components, and methods described herein may be implemented as electronic hardware. Various illustrative blocks, elements, components, and methods have been described above generally in terms of their functionality. Whether such functionality is implemented as hardware depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The predicate words "configured to" and "operable to" do not imply any particular tangible or intangible modification of a subject, but, rather, are intended to be used interchangeably. In one or more implementations, a receiver configured to receive and process an operation or a component may also mean the receiver being operable to receive and process the operation.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. Such disclosure may provide one or more examples. A phrase such as an aspect may refer to one or more aspects and vice versa, and this applies similarly to other phrases.

Any implementation described herein as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A transmitter circuit comprising:
   a first outbound signal path configured to carry a first outbound signal;
   a second outbound signal path configured to carry a second outbound signal;
   N passive mixers coupled to the first and second outbound signal paths and configured to up-convert the first and second outbound signals from a first frequency to a second frequency based on a clock cycle, wherein the first and second outbound signals are passed through the N passive mixers during each phase of 2*N phases in the clock cycle, where N is a positive even integer; and
   N radio frequency signal paths coupled to an output of respective ones of the N passive mixers and configured to receive the first and second outbound signals in the second frequency during each phase of the clock cycle.

2. The transmitter circuit of claim 1, wherein the first and second outbound signal paths respectively comprise:
   a digital-to-analog converter;
   a filter coupled to an output of the digital-to-analog converter; and
   a buffer coupled to an output of the filter.

3. The transmitter circuit of claim 1, wherein the N radio frequency signal paths respectively comprise:
   a first power amplifier coupled to a respective one of the N passive mixers; and
   a second power amplifier coupled to the first power amplifier.

4. The transmitter circuit of claim 3, further comprising:
   a third power amplifier coupled to the N radio frequency signal paths via a respective one of the second power amplifier; and
   an antenna coupled to the third power amplifier,
   wherein the third power amplifier is configured to combine the N radio frequency signals into a transmission signal and output to the antenna.

5. The transmitter circuit of claim 4, wherein the N radio frequency signal paths respectively comprise:
   a phase shifter coupled between the first power amplifier and the second power amplifier,
   wherein the phase shifter is configured to shift a carrier component of the respective one of the N radio frequency signals paths by a defined phase.

6. The transmitter circuit of claim 1, wherein the N radio frequency signal paths respectively comprise:
   a power amplifier;
   a phase shifter coupled to the power amplifier; and
   an antenna coupled to the power amplifier,
   wherein the power amplifier is composed of a plurality of stages,
   wherein the phase shifter is coupled between a first stage and a second stage of the plurality of stages, and
   wherein the antenna is coupled to a third stage of the plurality of stages.

7. The transmitter circuit of claim 3, wherein the first and second power amplifiers of respective ones of the N radio frequency signal paths are formed on a same die.

8. The transmitter circuit of claim 1, wherein the N passive mixers are formed on a first die and the N radio frequency signal paths are formed on a second die, wherein the first die is complementary metal-oxide-semiconductor (CMOS) and the second die is silicon-on-insulation (SOI).

9. The transmitter circuit of claim 1, wherein the N passive mixers are configured to receive N local oscillator clock signals that are shifted in phase and each corresponds to a respective one of 2*N phases in a clock cycle.

10. A transmitter circuit comprising:
first and second outbound signal paths respectively comprising:
a digital-to-analog converter;
a filter coupled to an output of the digital-to-analog converter; and
a buffer coupled to an output of the filter;
a plurality of radio frequency signal paths; and
a plurality of passive mixers coupled to the first and second outbound signal paths and the plurality of radio frequency signal paths, the plurality of passive mixers configured to receive differential outbound signals via the first and second outbound signal paths and a plurality of local oscillator (LO) clock signals shifted in phase and each LO clock signal having a phase corresponding to a respective one of a plurality of phases in a clock cycle, the plurality of passive mixers configured to up-convert the differential outbound signals from a first frequency to a second frequency based on the clock cycle, wherein the differential outbound signals are passed through the plurality of passive mixers during each phase of the plurality of phases in the clock cycle; and
a plurality of power amplifiers coupled to the plurality of passive mixers via the plurality of radio frequency signal paths.

11. The transmitter circuit of claim 10, wherein the plurality of power amplifiers comprise first stage amplifiers coupled to an output of respective ones of the plurality of passive mixers, second stage amplifiers coupled to an output of the respective first stage amplifiers, and a third stage amplifier coupled to outputs of the second stage amplifiers, and further comprising an antenna coupled to an output of the third stage amplifier.

12. The transmitter circuit of claim 11, wherein the plurality of power amplifiers on the plurality of radio frequency signal paths comprise a respective phase shifter coupled between an output of the respective first stage amplifiers and an input of the respective second stage amplifiers and configured to adjust a phase of a respective passive mixer signal.

13. A transmitter circuit comprising:
a mixer network configured to up-convert first and second outbound signals from a first frequency to a second frequency based on a clock cycle, wherein the first and second outbound signals are passed through the mixer network during each phase of a plurality of phases in the clock cycle;
one or more power amplifiers coupled to the mixer network and configured to amplify a respective plurality of outputs of the mixer network, at least one power amplifier of the one or more power amplifiers comprising a first stage amplifier coupled to the respective plurality of outputs of the mixer network, a second stage amplifier coupled to an output of the first stage amplifier, and a third stage amplifier coupled to an output of the second stage amplifier; and
a phase shifter coupled to at least one of the first stage amplifier, the second stage amplifier, or the third stage amplifier of the at least one power amplifier.

14. The transmitter circuit of claim 13, further comprising: an antenna coupled to an output of the third stage amplifier of the at least one power amplifier,
wherein the phase shifter is coupled between the output of the first stage amplifier of the at least one power amplifier and an input of the second stage amplifier of the at least one power amplifier and configured to adjust a phase of a mixer signal output from the mixer network.

15. The transmitter circuit of claim 13, wherein the mixer network comprises:
a first positive input;
a first negative input;
a second positive input;
a second negative input;
N positive output instances, where N is a positive even integer;
N negative output instances; and
N passive mixer instances,
wherein the N passive mixer instances respectively comprise:
a first switch,
a second switch,
a third switch,
a fourth switch,
a fifth switch,
a sixth switch,
a seventh switch, and
an eighth switch,
wherein the first positive input is coupled to a drain node of the first and fourth switches of respective ones of the N passive mixer instances,
wherein the first negative input is coupled to a drain node of the second and third switches of respective ones of the N passive mixer instances,
wherein the second positive input is coupled to a drain node of the fifth and eighth switches of respective ones of the N passive mixer instances,
wherein the second negative input is coupled to a drain node of the sixth and seventh switches of respective ones of the N passive mixer instances,
wherein the N positive output instances are coupled to a source node of the second, fourth, sixth and eighth switches of respective ones of the N passive mixer instances,
wherein the N negative output instances are coupled to a source node of the first, third, fifth and seventh switches of respective ones of the N passive mixer instances,
wherein the N passive mixer instances are configured to upconvert first and second outbound signals from a baseband frequency to a radio frequency based on a clock cycle, and
wherein the first and second outbound signals are passed through the N passive mixers during each phase of 2*N phases in the clock cycle.

16. The transmitter circuit of claim 15, wherein:
the first and second switches of respective ones of the N passive mixer instances are coupled to a first clock node,
the third and fourth switches of respective ones of the N passive mixer instances are coupled to a second clock node,
the fifth and sixth switches of respective ones of the N passive mixer instances are coupled to a third clock node, and
the seventh and eighth switches of respective ones of the N passive mixer instances are coupled to a fourth clock node.

17. The transmitter circuit of claim 16, wherein the N passive mixer instances are configured to receive a same local oscillator clock signal via a respective one of the first, second, third and fourth clock nodes when N equals 2, wherein the N passive mixer instances are configured to receive a different local oscillator clock signal via the respective one of the first, second, third and fourth clock nodes when N is greater than 2.

18. The transmitter circuit of claim 15, wherein the first outbound signal is a differential in-phase (I) modulation signal and the second outbound signal is a differential quadrature (Q) modulation signal, wherein the first positive input and the first negative input are configured to receive the differential I modulation signal, and wherein the second positive input and the second negative input are configured to receive the differential Q modulation signal.

19. The transmitter circuit of claim 15, wherein the N positive output instances and the N negative output instances are configured to form differential output pairings, wherein each of the differential output pairings is associated with a respective one of a plurality of radio frequency signal paths coupled to the mixer network.

20. The transmitter circuit of claim 13, wherein the mixer network comprises:
   N passive mixers coupled to a plurality of radio frequency signal paths via N positive outputs and N negative outputs, where N is a positive even integer,
   wherein the N passive mixers respectively comprise:
      a first pair of switches,
      a second pair of switches,
      a third pair of switches, and
      a fourth pair of switches,
   wherein the first and second pairs of switches are coupled to a first differential input,
   wherein the third and fourth pairs of switches are coupled to a second differential input,
   wherein the first and third pairs of switches are coupled to respective ones of the N negative outputs,
   wherein the second and fourth pairs of switches are coupled to respective ones of the N positive outputs,
   wherein the N passive mixer instances are configured to up-convert a first outbound signal via the first differential input and a second outbound signal via the second differential input from a first frequency to a second frequency based on a clock cycle, and
   wherein the first and second outbound signals are passed through the N passive mixers during each phase of 2*N phases in the clock cycle.

\* \* \* \* \*